US006556953B2

(12) United States Patent
Lay et al.

(10) Patent No.: US 6,556,953 B2
(45) Date of Patent: Apr. 29, 2003

(54) AUTOMATIC TESTING OF REDUNDANT SWITCHING ELEMENT AND AUTOMATIC SWITCHOVER

(75) Inventors: Samuel C. Lay, Broomfield, CO (US); Jeffrey J. Nelson, Louisville, CO (US); James Rodgers, Boulder, CO (US); Kenneth N. Jessop, Arvada, CO (US)

(73) Assignee: McData Corporation, Broomfield, CO (US)

( * ) Notice: Subject to any disclaimer, the term of this patent is extended or adjusted under 35 U.S.C. 154(b) by 79 days.

(21) Appl. No.: 09/829,448

(22) Filed: Apr. 9, 2001

(65) Prior Publication Data

US 2002/0147569 A1 Oct. 10, 2002

(51) Int. Cl.$^7$ ................................................. H02H 3/05
(52) U.S. Cl. .......................................... 702/183; 714/56
(58) Field of Search ............................ 714/47, 48, 55, 714/56; 702/183, 186

(56) References Cited

U.S. PATENT DOCUMENTS

| | | | |
|---|---|---|---|
| 5,426,420 A | * | 6/1995 | Nagler .................. 340/825.01 |
| 5,490,007 A | | 2/1996 | Bennett et al. |
| 5,740,157 A | | 4/1998 | Demiray et al. |
| 5,848,227 A | | 12/1998 | Sheu |
| 5,959,972 A | * | 9/1999 | Hamami .................... 370/228 |
| 6,138,185 A | | 10/2000 | Nelson et al. |

\* cited by examiner

Primary Examiner—Marc S. Hoff
Assistant Examiner—Craig Steven Miller
(74) Attorney, Agent, or Firm—Hogan & Hartson L.L.P.

(57) ABSTRACT

A non-disruptive, on-line testing and switchover method and apparatus in a high availability, fiber channel switching environment. In a network having an active switching element, a redundant switching element and a port, one aspect of the present invention provides for verifying a working data path from the port to the redundant switching element, and thereafter verifying a working control path to the redundant switching element. Both verification tests take place without interrupting operation on the network. In addition, another aspect of the present invention provides for recognizing a failure occurrence in the active switching element, and thereafter switching to the redundant switching element with the potential for minimal frame loss.

27 Claims, 7 Drawing Sheets

AUTOMATIC TESTING OF REDUNDANT SWITCHING ELEMENT AND AUTOMATIC SWITCHOVER

BACKGROUND OF THE INVENTION

The present invention relates, in general, to the field of fibre channel switching technology. More particularly, the present invention relates to non-disruptive, on-line testing and switchover in a high availability, fibre channel switching environment.

Fibre Channel is a high performance, serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols.

Fibre channel employs a topology known as a "fabric" to establish connections between ports. A fabric is a network of switches for interconnecting a plurality of devices without restriction as to the manner in which the switch can be arranged. A fabric can include a mixture of point-to-point and arbitrated loop topologies.

In Fibre Channel, a channel is established between two nodes where the channel's primary task is to transport data from one point to another at high speed with low latency. The Fibre channel switch provides flexible circuit/packet switched topology by establishing multiple simultaneous point-to-point connections. Because these connections are managed by the switches or "fabric elements" rather than the connected end devices or "nodes", fabric traffic management is greatly simplified from the perspective of the device.

In a high availability, fibre channel switching environment, a second set of "redundant" elements are provided in the event of a failure condition. The number and make-up of the redundant elements parallel the primary elements, and operate as back-up resources if the primary elements fail. As such, in the event of such a fail condition, a switchover to the redundant elements can greatly minimize the loss of transmitted data frames.

In prior approaches, the redundant elements in a high availability environment are passive in nature. This approach provides a second set of elements that remain inactive until the occurrence of a fail condition. In such an all-or-nothing passive environment, it becomes necessary to take a system offline to perform the necessary tests on the elements to determine if they are still in working condition. Since taking a system offline is often not a viable option, the unfortunate effect is a lack of a significant method of testing the redundant elements. As a result, switching over to the redundant elements may result in a situation where an element is either partially or completely non-functional.

Another limitation of prior systems is that during switchover to the redundant elements in a failure condition, frames were lost, since there was no implementation of a completely seamless method of transition to the redundant elements. It is well understood that for a catastrophic failure event, immediate switchover is of paramount importance. However, for a non-catastrophic failure, the significance of immediacy becomes secondary to the importance of maintaining the integrity of a frame transmission.

SUMMARY OF THE INVENTION

The on-line testing and switchover design of the present invention provides a solution to the aforementioned problems which is vastly superior to anything currently available. It not only solves the critical situation where, after switchover, an element is either partially or completely non-functional, but it does so in an extremely efficient manner without requiring any significant design changes and with only a relatively straightforward alteration to existing processes for networking in a high availability, fibre channel switching environment.

The present invention advantageously provides a proactive management approach for verifying the integrity of a redundant switching element prior to actual use. More particularly, the on-line testing and switchover design of the present invention offers independent, non-disruptive online testing via an independent request/response signaling interface on a per port basis. Since the invention operates on a per port basis, it is unnecessary to shut down the other operating ports to carry out the testing operation, and therefore the ports can continue to transmit data. In addition, the invention advantageously provides the ability to switch over to a redundant switching element on a frame boundary, thereby reducing the possibility of losing a frame during the transition from a currently functioning path to a backup path.

Particularly disclosed herein is a method of performing an online, non-disruptive health check test in a fully redundant fibre channel switching network having an active switching element and a redundant switching element. The health check test is performed on the redundant switching element without the need to take the network offline. After a first and second status condition are met prior to the expiration of a timer, a working data path from a port to the redundant switching element is verified and the condition is recorded. Then, a working control path to the redundant switching element is verified and the condition is recorded.

In another aspect, the present invention provides a method of performing automatic switchover in a fully redundant fibre channel switching network having an active switching element, a redundant switching element and a port having switching element logic embodied therein. To begin, a failure condition is detected in the active switching element. The failure condition is transmitted to the port logic. In response to a possible problem with the active switching element, software notifies the port logic to perform the switchover. Notification may originate from either the active switching element or port logic via software collection. In response, the port is queried to determine if the port is transmitting a frame. If a port is in the process of transmitting a frame, then the automatic switchover is delayed until the port is not transmitting a frame.

Still further disclosed herein is a fibre channel switching network having increased bandwidth capacity. The network comprises a first switching element, a second switching element, a first reader coupled to the first switching element and a second reader coupled to the second switching element. Continuing, the switching network also has a buffer memory for storing frames, wherein the buffer memory is coupled to the first reader and the second reader. The network also has a writer coupled to the buffer memory, wherein the writer directs a buffer control to store frames in the buffer memory. The first reader or the second reader directs the buffer control to retrieve a frame from buffer memory and pass the frame to the respective reader for transmission.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
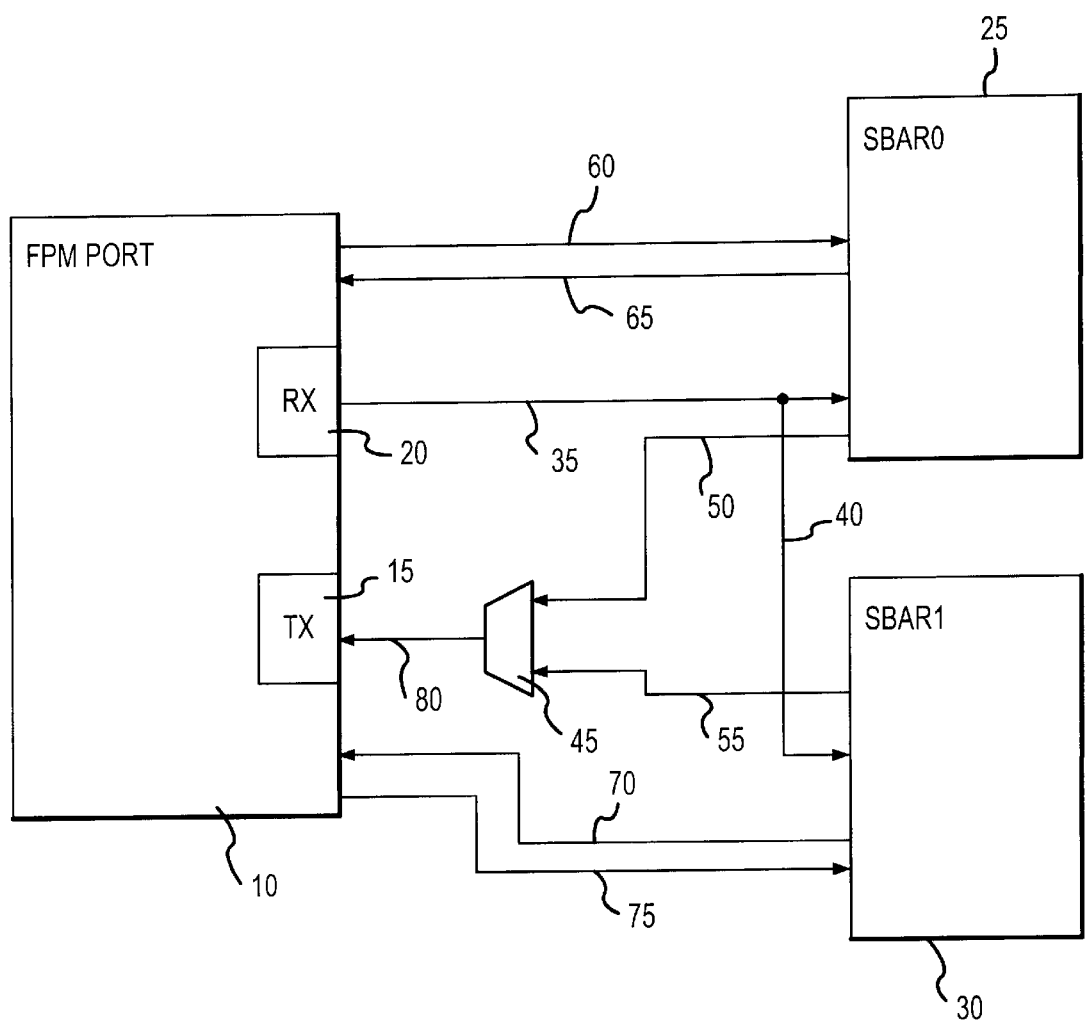
FIG. 1 is a block diagram of two switching elements, a single fibre port module having switching element control logic, an RX port and a TX port.

FIG. 1 shows a fully redundant, generalized fibre channel switching environment implementing the method and systems of the present invention. FIG. 1 illustrates a number of devices and connections between the devices that are indicated by connecting lines. In particular, two switching elements or SBAR's, SBAR0 25 and SBAR1 30, are shown coupled to a fibre port module 10 over receive paths or inbound paths 35, 40 and transmit or outbound paths 50, 55. Fibre port module 10 has port logic embodied thereon, however, only the SBAR control interface logic of fibre port module 10 is shown in FIG. 1. In addition, fibre port module 10 comprises receive (RX) block 20 and transmit (TX) block 15 for coupling fibre port module 10 to and from the backplane.

SPAR0 25 and SBAR1 30 each have a fully independent request/response interface mechanism for processing requests and responses to and from fibre port module cards embodied within fibre port module 10. As shown in FIG. 1, SBAR0 25 communicates with fibre port module 10 over request line 60 and response line 65. Similarly, SBAR1 communicates with fibre port module 10 over request line 75 and response line 70. For example, fibre port module 10 may transmit a request for connection to SBAR1 30 over request line 75. SBAR1 30 responds over response line 70 with a response, such as "destination port busy." In one embodiment, data on both request lines 60, 75 and response lines 65, 70 is serially encoded for transmission between fibre port module 10 and SBAR0 25 and SBAR1 30.

Also shown in FIG. 1 is data control multiplexer 45, which is coupled to fibre port module 10 by connection 80. Data control multiplexer 45 is also coupled to SBAR0 25 via outbound path 50, and to SBAR1 30 via outbound path 55. Connection 80 is part of outbound paths 50, 55 respectively depending upon which SBAR is active. Using logic that is not shown, data control multiplexer 45 transmits data from the active SBAR, either SBAR0 25 or SBAR1 30, to fibre port module 10. The logic stores the identity of the active SBAR, which provides data control multiplexer 45 with sufficient information so as to pass through the data from either outbound path 50 or outbound path 55 to fibre port module 10.

Continuing with FIG. 1, one example of a frame transmission from a port to a redundant network of switching elements will now be explained in detail. In operation, a single frame appears at fibre port module 10 intended for a particular destination port. Fibre port module 10 sends a connection request to the active switching element. Logic within fibre port module 10 indicates which SBAR is active and which SBAR is redundant. In this example, SBAR1 30 is the active switching element and SBAR0 25 is the redundant switching element. For purposes of being complete, since SBAR0 25 is a redundant switching element, the default condition is that for each port, the redundant switching element is looped back to itself, i.e. RX 20 is looped back to TX 15 for SBAR0 25.

Continuing with the example, since SBAR1 30 is the active switching element, fibre port module 10 sends a connection request, sb_sbar1_req, to SBAR1 30 over request line 75 seeking to transmit the single frame to the particular destination port. SBAR1 30 investigates and determines if the particular destination port is available. If the particular destination port is unavailable, SBAR1 30 responds with a "destination port busy" response, and a connection is not established. If the particular destination port is available, an appropriate response is sent to fibre port module 10 over response line 70 indicating that the connection is established. The fibre port module then prepares to send the frame to the switching elements. In this case, the switching elements are now deemed busy and frames cannot be transmitted through the busy port until the connection is terminated.

The single frame is then transmitted from RX port 20 over inbound paths 35, 40. Since the illustrated example is a fully redundant fibre channel switching network, the frame is transmitted over both inbound path 40 to active switching element SBAR1 30 as well as inbound path 35 to redundant switching element SBAR0 25.

The return paths from SBAR0 25 and SBAR1 are outbound path 50 and outbound path 55 respectively through data control multiplexer 45 over connection 80 to TX port 15. Since redundant switching element 25 is looped back to itself for this port, the single frame is transmitted through SBAR0 25 and appears at data control multiplexer 45. As stated previously, data control multiplexer 45 contains logic to ascertain the identity of the active switching element, in this case SBAR1 30. Since SBAR0 25 is the redundant switching element, the frame from SBAR0 25 is discarded, and the frame transmitted from SBAR1 30 is passed through to TX port 15 of fibre port module 10.

Figure 2:
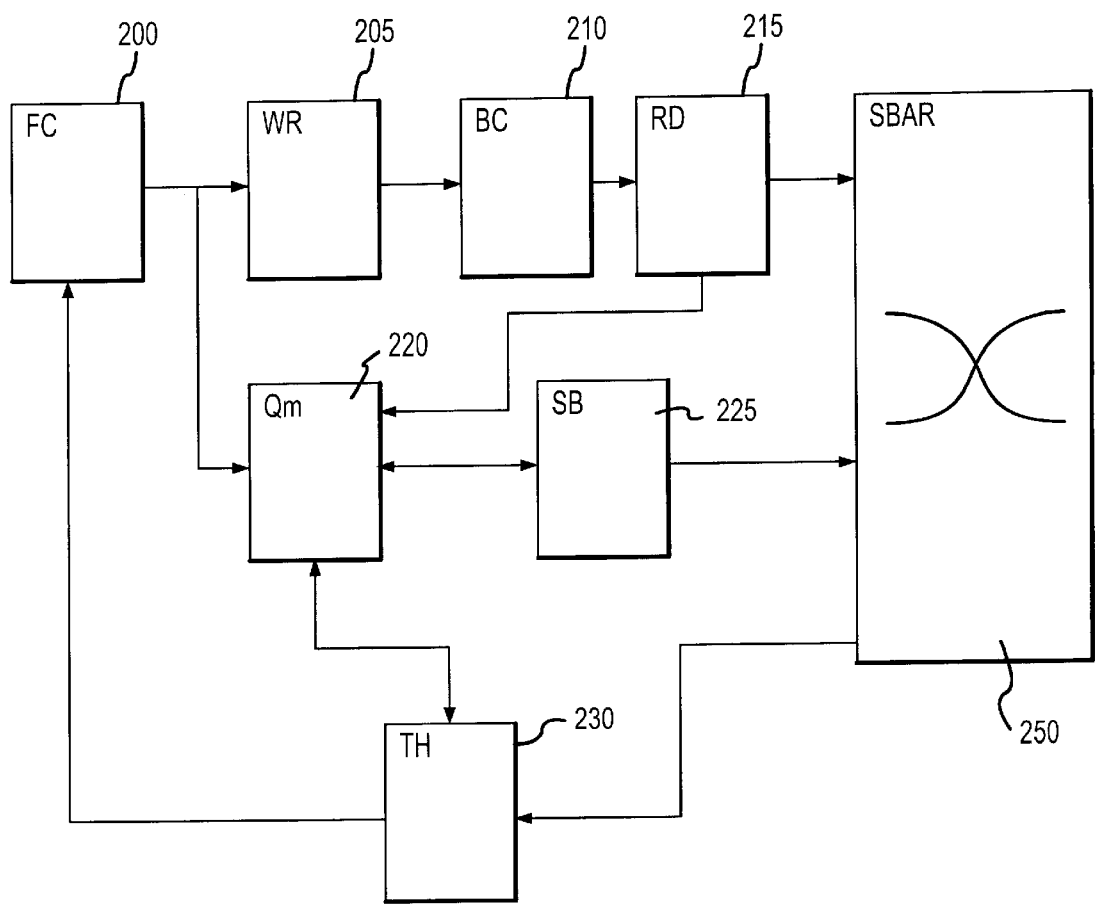
FIG. 2 is a block diagram showing the functionality of a fibre port module.

FIG. 2 illustrates another aspect of fibre port module 10 for implementing the method and systems of the present invention. Fibre channel front end (FE) 200 provides an interface to a central processor (CTP). The main element of the CTP is the system services processor (SSP) that provides processing power. In the case of processing frame traffic, FE 200 provides independent, symmetrical RX and TX interfaces to carry frame data. Coupled to FE 200 is frame writer 205. In operation, FE 200 forwards a frame to frame writer 205 for storage in buffer memory 210. Frame writer 205 stores the frame in the next available buffer in buffer memory 210, modifies a free buffer list accordingly and passes the buffer location to queue manager ($Q_m$) 220. Frame reader 215 is responsible for reading frames stored in buffer memory 210 and transferring them to SBAR 250.

Continuing with FIG. 2, $Q_m$ 220 is the central core of fibre port module 10. $Q_m$ 220 is responsible for building queues of received frames for destination ports from the information received from frame writer 205 as well as providing buffer location information to frame reader 215. $Q_m$ 220 also interfaces with switching element (SBAR) 250 through SB control logic 225 for the establishment of connections as a source.

Transmit handler 230 provides the interface for the transmission of the frames at the port. The transmit handler logic interfaces to both SBAR's in a fully redundant switching network. However, through CTP control, only one interface is active at a time.

Health Check Test

In one embodiment, a health check test is initiated by a Central Processor (CTP) via a control register bit in the SB logic contained within fibre port module 10. The initiation of the health check test may be software driven by operational or online software, and as such, the test could be activated on a regular schedule, e.g. hourly, weekly, or monthly to name a few. By activating the control register bit in the SB logic of fibre port module 10, the CTP is in effect "taking control" of the port and the associated paths for a brief period of time to perform the health check test. During this brief period of time the port is under control, the port remains "offline" to new requests. The term "offline" simply means that the port remains unavailable for sending frames to the active switching element. However, the port still receives and buffers new frames via the front end logic until the port runs out of available buffers. The offline condition occurs only when the first status condition described later is satisfied.

Figure 3:
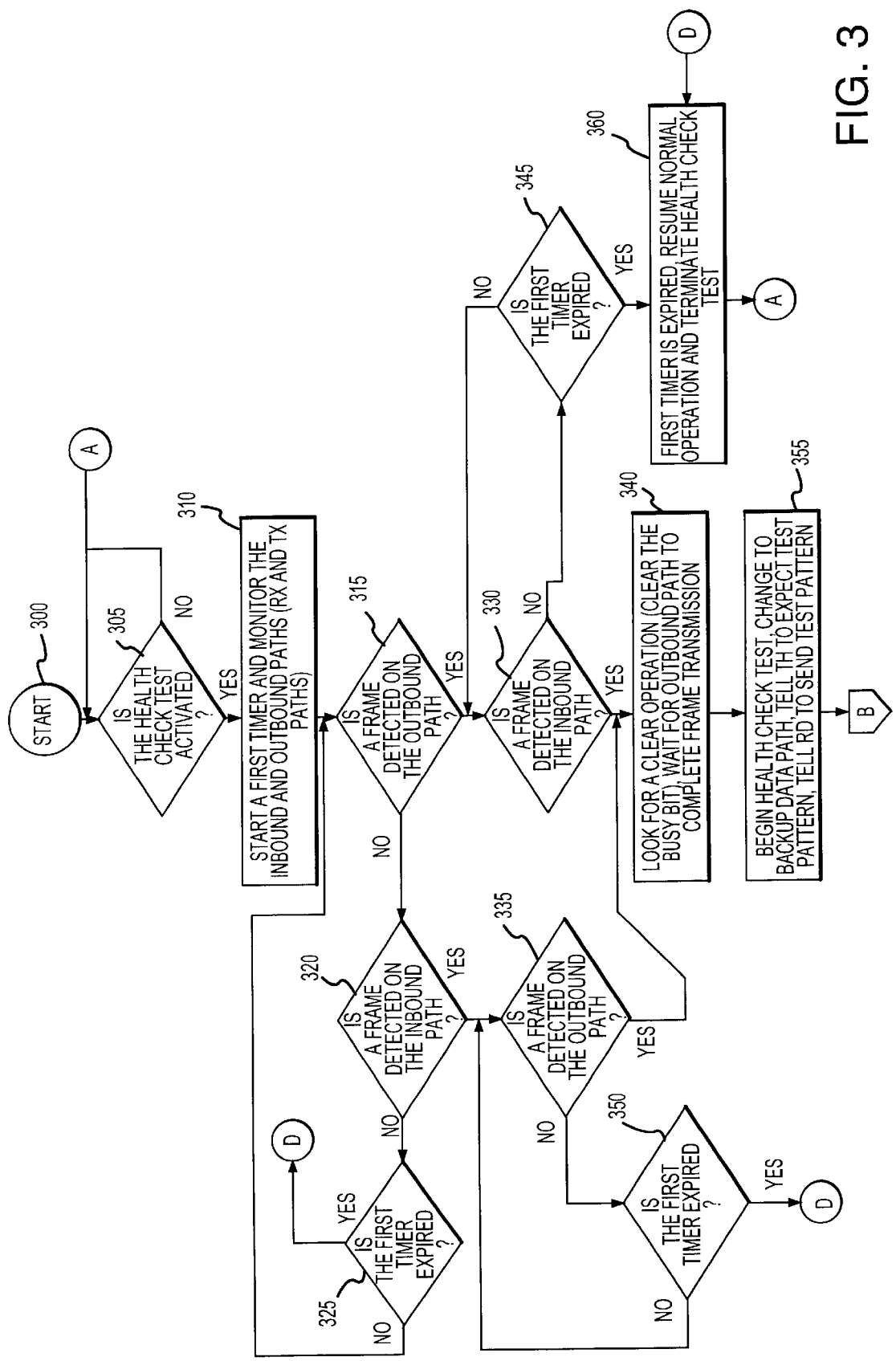
FIG. 3 is a flow chart for the health check test.
Figure 4:
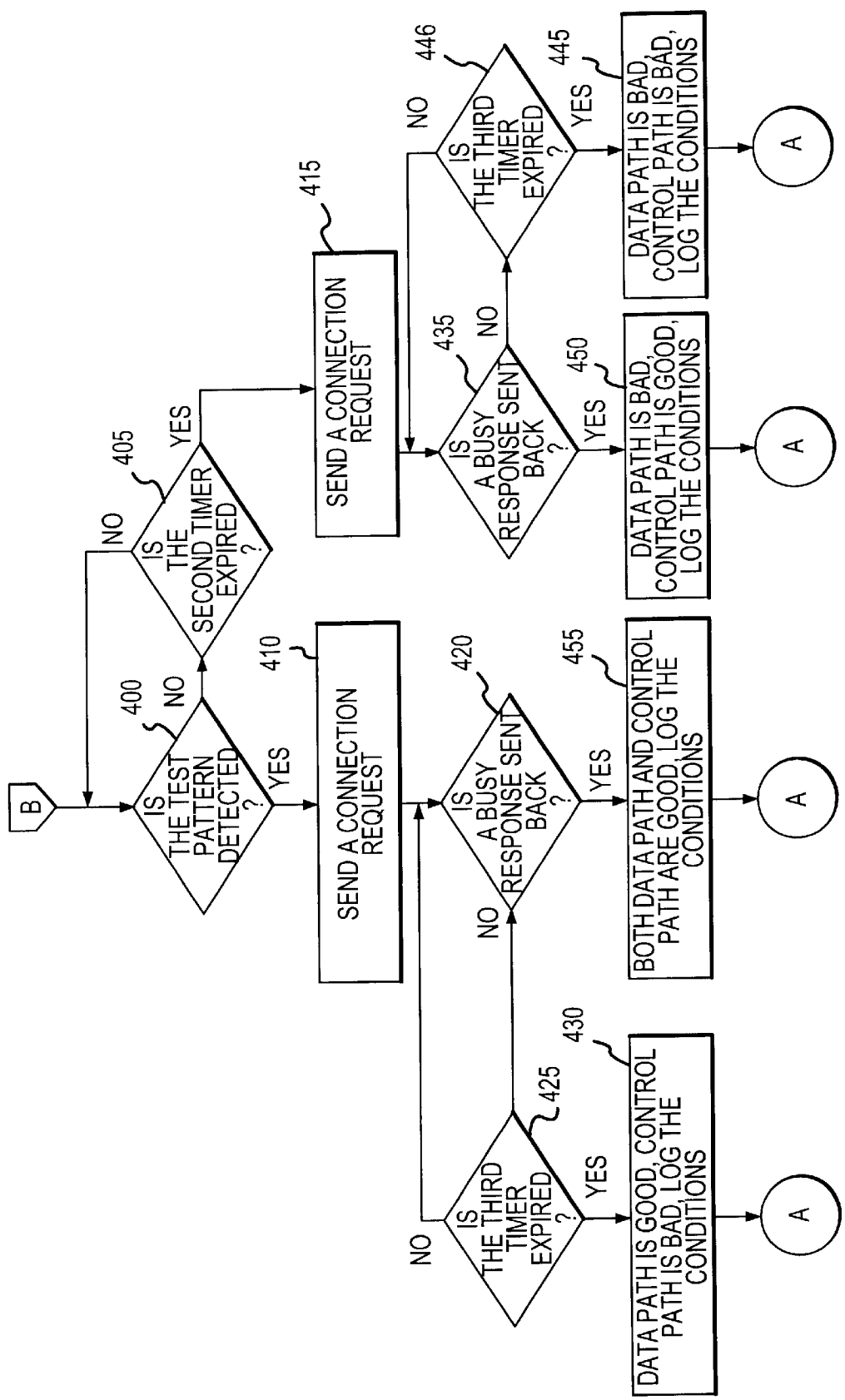
FIG. 4 is a flow chart for the health check test.

FIGS. 3 and 4 illustrate, using flow charts, one embodiment of a health check test in accordance with one aspect of the present invention. For purposes of clarity, the health check test is best explained in two parts. The first part of the test verifies the integrity of a data path between a port and a redundant switching element. The second part of the test verifies the integrity of a control path between a port and a redundant switching element. In combination, the two parts of the illustrated health check test evaluate the operating condition of a redundant switching element, thereby determining if it would function properly in a switchover condition. The two parts are explained in greater detail in the sections that follow.

Data Path Test

Once the fibre port module 10 acknowledges that the CTP has set a register bit in the SB logic to begin the health check test, the logic begins the process of taking control of the port and the corresponding data and control paths to both the active and redundant switching elements. In accordance with one important aspect of the invention, certain limits are in place as to how long the port is allowed to remain in test mode since the test is designed to minimize disruption to the port. In most cases, the limits are controlled by timers that, if expire, operate to return the port to active status and terminate the health check test.

As shown in the flow chart shown in FIG. 3, the fibre port module 10 determines, through its internal port logic, whether the CTP has initiated a health check test (step 305). If a health check test has been initiated, the SB logic within fibre port module begins the process of taking control of the port and associated paths. The control logic, and more particularly a state machine within the control logic, monitors the status of the inbound and outbound paths (step 310) for the occurrence of a frame.

A first timer, or inactivity timer, starts a termination countdown (step 310) at the same time the control logic begins monitoring both the status of the inbound or transmit (TX) path and the status of the outbound or receive (RX) path. The inactivity timer places a limit on the amount of time the port will monitor the inbound and outbound path for a frame transmission before timing out and returning the port to normal operation. In one embodiment, the timer is set to expire after 100 microseconds. Advantageously, the inactivity timer prevents stalling the port while waiting for the correct transmit and receive conditions to be met on the inbound and outbound paths.

Continuing with the example of FIG. 3, the port logic of fibre port module 10 monitors the outbound path for the occurrence of a frame (step 315). It should be understood that since the logic is monitoring both paths simultaneously, the order of the steps of monitoring the inbound and outbound paths is arbitrary and is illustrated in FIG. 3 in any particular order solely for purposes of explanation. If a frame is detected on the outbound path, the logic continues to monitor the inbound path for the occurrence of a frame (step 330).

If a frame is then detected on the inbound path, the logic has detected the correct status of both the RX and TX paths. The logic then performs several operations to control the port and paths (step 340) that are explained in the paragraphs that follow. If the first timer expires at any point prior to detecting of a frame on both the inbound and outbound paths (steps 325, 345 and 350), the port immediately returns to normal operations and the health check test is terminated (step 360).

Referring back to the flow chart of FIG. 3, a first status condition, as that term is used herein, describes the occurrence of a frame on the RX path prior to the expiration of the inactivity timer (steps 320 and 330). The first status condition triggers the SB logic of the port to block any new requests from being sent through the port. If any new requests are received, the new requests will be placed in queue until the completion of the health check test. The new requests are the sent when the port resumes normal operation, which is either completion or termination of the health check test.

The occurrence of a first status condition also provides for a delay of a certain length of time to allow the completion of any frame transmission on the RX path. In one embodiment, the delay is for a period of 20 microseconds. In any case, the delay should be at least long enough to allow for the maximum length of a fibre channel frame or the length of time necessary to make certain the RX path is clear.

Referring again to FIG. 3, a second status condition, as that term is used herein, describes the appearance of a frame on the TX path prior to the expiration of the inactivity timer (steps 315 and 335). The second status condition triggers the SB logic of the port to hold off clearing the ports busy bit. The term is busy bit is used as an indication to the switching element that the port is either available or unavailable to transmit a frame. Once the health check test is either competed or terminated, the ports busy bit is cleared allowing the port to resume normal operations.

Once the first status condition and second status condition are satisfied, the port logic is temporarily in control of fibre port 10 and the associated data paths and control paths. The health check test may be engaged by the port logic (step 355). In one embodiment, prior to engaging the health check test, the active data path is changed from the active switching element to the redundant switching element. In the illustrated example of FIG. 1, a data path multiplexer 45 switches to the opposite of the programmed register value, thereby setting the inbound data to the port to come from the redundant switching element.

The port logic instructs the RX logic to transmit a test data pattern on the RX path to the redundant switching element. Concurrently, the port logic instructs the TX logic to monitor the TX path for the appearance of the test data pattern. In one embodiment, the test data pattern is programmed into a shared register in the port. Since the receive and transmit ports are looped together for a redundant switching element, the data sent on the RX side will appear at the TX side if the switching element is in operating condition.

A second timer, or an expect frame time out timer, starts at the same time the port logic instructs the RX logic to transmit the test data pattern. The expect frame time out timer places a limit on the amount of time the port logic will monitor the inbound path for the test data pattern before timing out and proceeding to the control path test. In one embodiment, the timer is set to expire after 10 microseconds.

Referring now to the flow chart of FIG. 4, the SB logic in the port monitors the receipt or non-receipt of the test data pattern. If the test data pattern is detected at the port prior to the timeout of the second timer (step 400), a data path good condition of the redundant switching element is logged at the port. However, if the second timer expires prior to the detection of the test data pattern (step 405), a data path bad condition is logged at the port. In either case, once the condition of the data path is recorded, the data path test is complete and the control path test begins.

Control Path Test

Continuing with FIG. 4, the illustrated control path test is a relatively quick method for determining the integrity of the control path between a port and a redundant switching element. Since the test is a continuation of the data path test, it should be understood that even though the data path test is complete, the port logic is still in control of fibre port 10 and the associated data paths and control paths.

As shown in FIG. 4, a connection request is sent from the port to the redundant switching element (steps 410 and 415). Since the default condition for a redundant switching element is to set all the busy bits to an on position, a connection request from the port should elicit a "destination port busy" response.

A third timer, or an expect response time out timer, starts at the same time the connection request is sent from the port to the redundant switching element. The expect response time out timer places a limit on the amount of time the port logic will monitor the control path for the "destination port busy" response before timing out and logging the results of the test. In one embodiment, the timer is set to expire after 3 microseconds.

Referring now to the flow chart of FIG. 4, the SB logic in the port monitors the receipt or non-receipt of the response to the connection request. If the "destination port busy" response is detected at the port prior to the timeout of the third timer (steps 420 or 435), a control path good condition of the redundant switching element is logged at the port. However, if the third timer expires prior to the detection of the "destination port busy" response or if some other corrupted or incorrect response is received (steps 425 and 440), a control path bad condition is logged at the port. Upon recording the condition of the control path, the control path test is complete. At this point, the health check test is over and the port resumes normal operation.

Multi-Drain Concept

Figure 5:
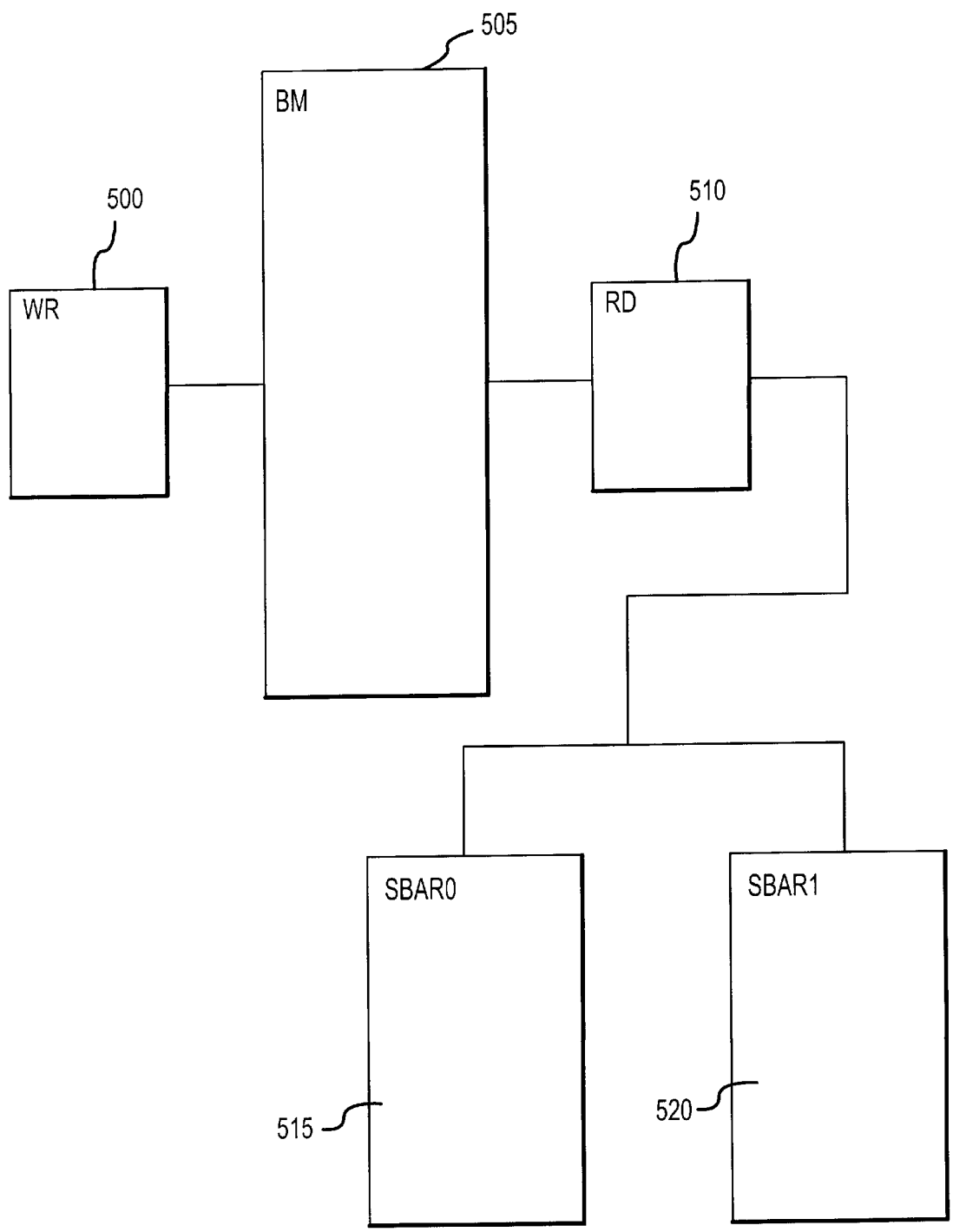
FIG. 5 is a prior art block drawing of a current configuration for switching elements.

FIG. 5 is a block diagram of prior art fibre channel switching system. Buffer memory 505 is coupled to a single frame writer 500 and a single frame reader 510. SBAR0 515 and SBAR1 520 are both coupled to frame reader 510. In operation, frames are stored in buffer memory 505 until they are switched through either SBAR0 or SBAR1. However, since only a single frame reader 510 is coupled to both SBAR0 515 and SBAR1 520, only a single switching element is operative at a given moment. Hence, only one read and one write operation is allowed in a particularly defined micro-cycle.

Figure 6:
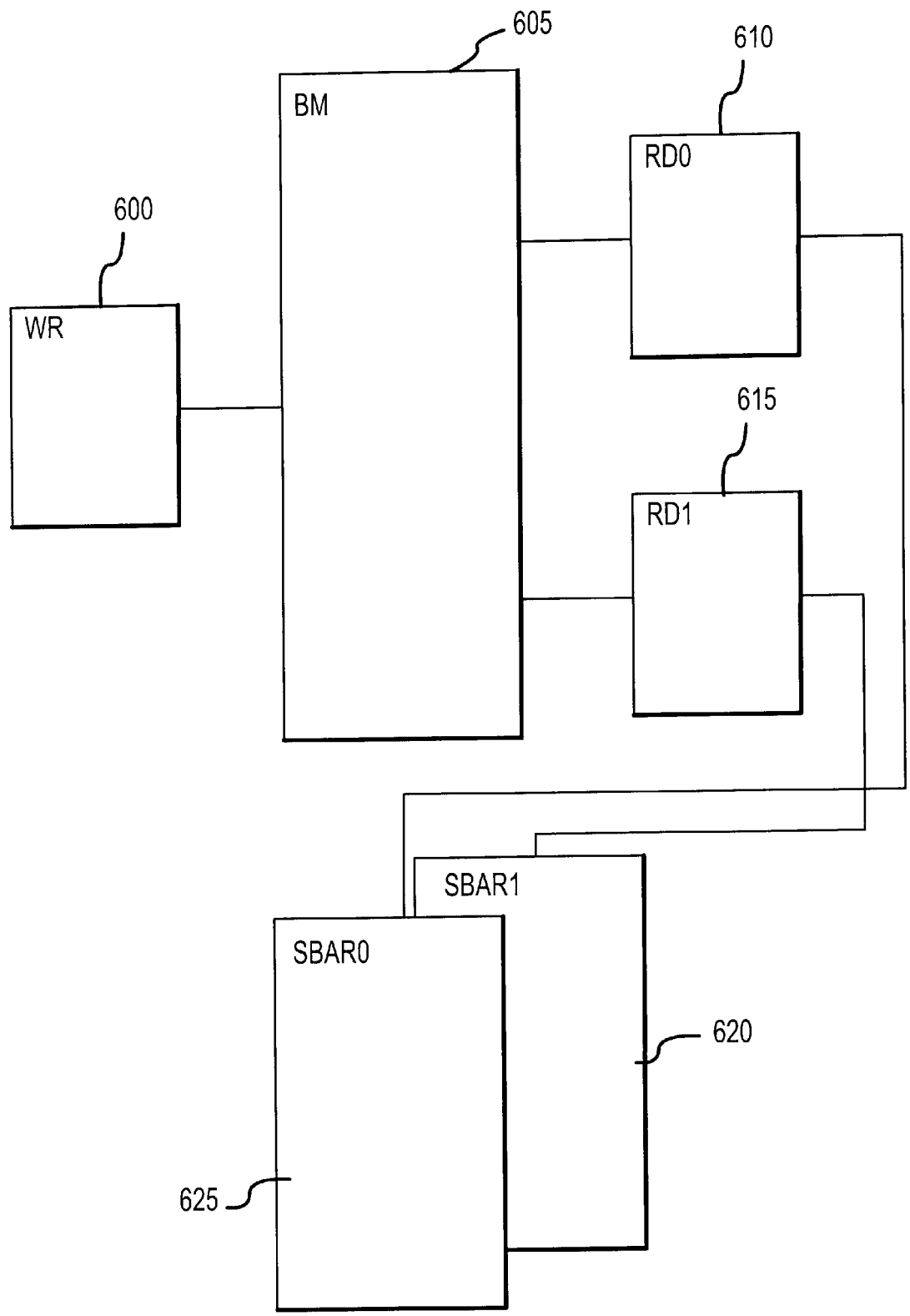
FIG. 6 is a block diagram of a multi-drain configuration in which both switching elements are active thereby increasing bandwidth.

FIG. 6 is a block diagram of a fibre channel switching system according to one embodiment of the present invention. Instead of a single frame reader coupled to the switching elements, each switching element has a frame reader operatively coupled thereto. As illustrated in FIG. 5, SBAR0 625 is coupled to frame reader 610 and SBAR1 620 is coupled to frame reader 615. In operation, a frame can be transmitted from buffer memory 605 through frame reader 610 to SBAR0 625. At the same time, a frame can be transmitted from buffer memory 605 through frame reader 615 to SBAR1 620. This type of operation allows for increased bandwidth since two switching elements are operating at the same time. In addition, in a failure situation involving one of the switching elements, a second switching element remains operating resulting in decreased bandwidth but no down time.

Automatic Switchover

Figure 7:
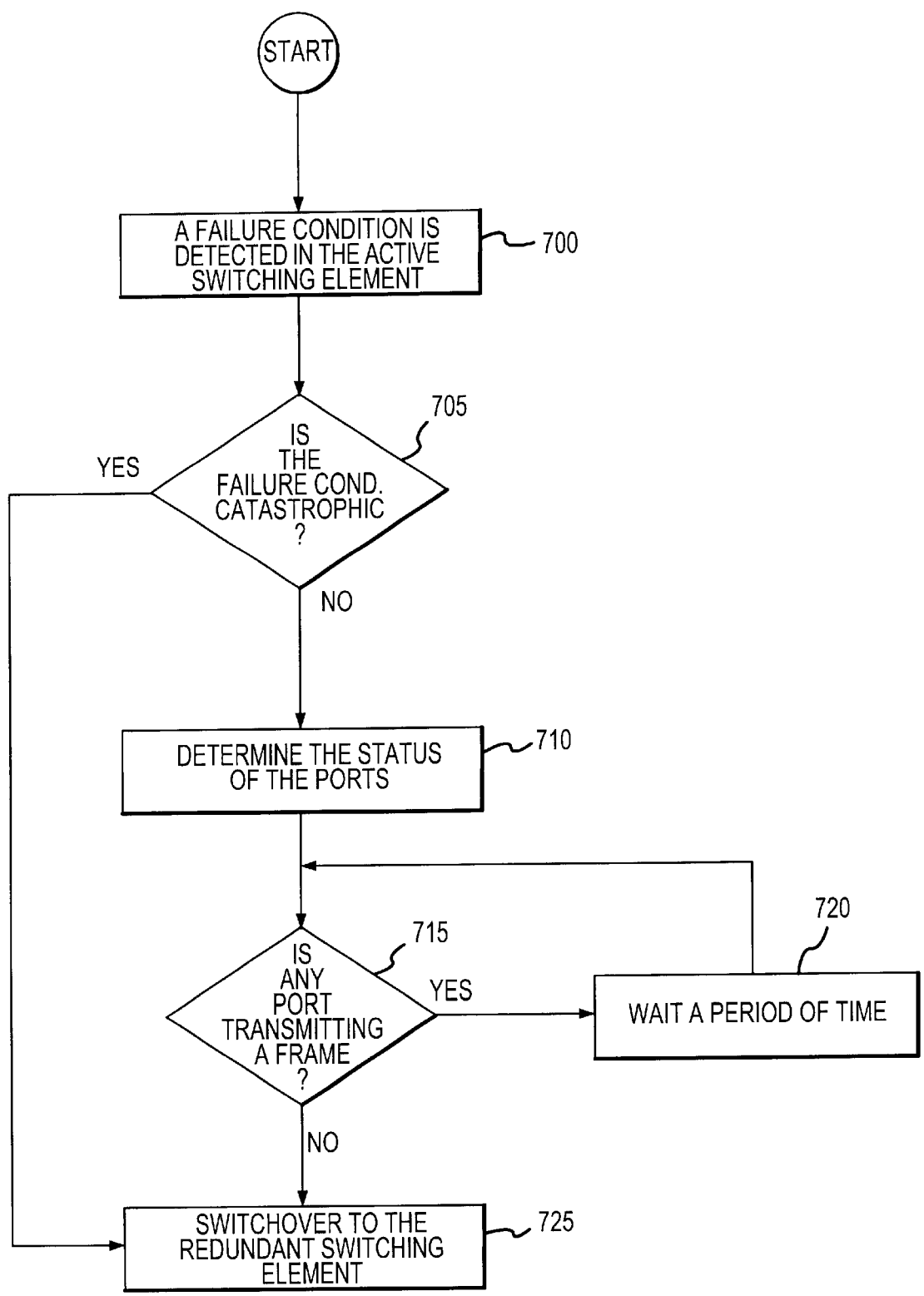
FIG. 7 is a flow chart for the automatic switchover.

Referring now to FIGS. 1 and 7, one embodiment of the automatic switchover aspect of the present invention is described. The automatic switchover aspect switches from an active switching element, such as SBAR1 30, to a redundant switching element, such as SBAR0 25, in response to a failure condition. The switchover is carried out so that any frames that may be transmitting at the time of the failure are completed. For example, only one port might be bad, but the other ports are still reliably transmitting frames. If the failure is not time critical requiring immediate switchover, the present invention allows for the continued operation of the switching element until all ports are out of frame.

To begin, a failure condition is detected at a switching element (step 700). Several examples of a non-catastrophic failure condition include a bad port, one or more ports identifying a channel from the switching element as bad while other channels continue to operate or failure to clear the busy bit for one or more ports to name a few. If the failure is a catastrophic failure requiring immediate attention without regard for the status of the frame transmission (step 705), such as loss of power, all busy bits not working or component failure that keeps an active switching element from performing an operational task to name a few, the switchover is immediate. However, if it is determined that the switchover can be delayed for a period of time without harming the integrity of the switching system, the automatic switchover feature provides a method of waiting until all frames are transmitted before performing the switchover.

Continuing with FIG. 1, SB logic within fibre port module 10 receives a signal that indicates the identity of the active SBAR. In the illustrated example, SBAR1 30 is the active SBAR. When a changeover is to occur, the signal will indicate the redundant SBAR is the new active SBAR. In the illustrated example, SBAR0 25 is the new active SBAR. The SB logic queries the TX port to determine if a frame is currently being transmitted over outbound path 80. If the port is "in frame" or currently transmitting a frame, then the SB logic will wait a period of time before executing the switch until a busy bit is received from the TX port. In one embodiment, the period of time is 10 microseconds.

Once the frame transmission is complete and the busy bit is received and detected by the SB logic, the SB logic proceeds to change the inbound data select to the value indicated by the main control bit. The inbound data select identifies the active SBAR, in this case the former redundant switching element SBAR0 25. The switchover has taken place and the busy bit is cleared to indicate the port is available to transmit frames again.

While there have been described above the principles of the present invention in conjunction with a specific embodiment, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein.

Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method of performing an online, non-disruptive health check test in a fully redundant fibre channel switching network having an active switching element, a redundant switching element, a port, a transmit path coupling said port with said redundant switching element and said active switching element and a receive path coupling said port with said redundant switching element and said active switching element, said port comprising port logic, a transmit portion and a receive portion, said health check test performed on said redundant switching element, said method comprising:

starting a first timer;

using said port logic, monitoring said receive path at said receive portion for a first status condition and monitoring said transmit path at said transmit portion for a second status condition;

terminating said health check test if said first timer expires before the occurrence of both said first status condition and said second status condition;

verifying a working data path from said port to said redundant switching element; and verifying a working control path to said redundant switching element.

2. The method of claim 1, wherein said step of verifying a working data path further comprises the steps of:

starting a second timer;

transmitting a test pattern on said receive path;

monitoring said transmit path for said test pattern; and terminating said step of verifying a working data path if said second timer expires before said test pattern appears on said transmit path.

3. The method of claim 1, wherein said step of verifying a working control path further comprises the steps of:

starting a third timer;

sending a connection request from said port to said redundant switching element;

monitoring said port for a busy response; and terminating said step of verifying a working control path if said third timer expires before said busy response appears at said port.

4. The method of claim 3, further comprising the step of clearing said busy bit after said step of verifying a working control path is complete.

5. The method of claim 1, wherein said first status condition comprises the transmission of a frame from said receive portion to said active switching element on said receive path and said second status condition comprises the appearance of a frame on said transmit path.

6. The method of claim 1 further comprising the step of setting a busy bit when said first status occurs, said busy bit indicating that said port is busy.

7. The method of claim 1, wherein said step of starting said first timer further comprises setting said first timer to expire in 100 microseconds.

8. The method of claim 1, wherein said redundant switching element couples said receive path to said transmit path.

9. The method of claim 1, further comprising the steps of:

blocking at least one new request from being sent to said port;

queuing said at least one new request until completion of said health check test; and transmitting said at least one new request upon completion of said health check test, wherein said blocking, queuing and transmitting steps occur prior to said step of verifying a working data path.

10. The method of claim 1, wherein said receive path is a path coupling said receive portion to said active switching element and said transmit path is a path coupling said transmit port and said active switching element, said method further comprising the step of switching said transmit path and said receive path from said active switching element to said redundant switching element, wherein said switching from said active switching element to said redundant switching element step occurs prior to said step of verifying a working data path.

11. The method of claim 10, further comprising the step of switching said transmit path and said receive path from said redundant switching element to said active switching element, wherein said switching from said redundant switching element to said active switching element step occurs after said step of verifying a working control path.

12. A method of performing an online, non-disruptive health check test in a fully redundant fibre channel switching network having an active switching element and a redundant switching element, said health check test performed on said redundant switching element, said method comprising:

verifying a working data path from a port to said redundant switching element, said data path comprising at least an inbound path and an outbound path, comprising the steps of:

starting a first timer;

monitoring said inbound path for an occurrence of a frame, said inbound path facilitates the movement of frames in a direction oriented from said port to both said redundant switching element and said active switching element;

monitoring said outbound path for an occurrence of a frame, said outbound path facilitates the movement of frames in a direction oriented from both said redundant switching element and said active switching element to said port;

terminating said health check test if said timer expires before both a frame occurs on said outbound path and a frame occurs on said inbound path;

sending a test pattern from said port to said redundant switching element on said inbound path;

starting a second timer;

monitoring said port for the occurrence of said test pattern on said outbound path;

logging a data path good condition if said test pattern arrives at said port; and logging a data path bad condition if said second timer expires before said test pattern arrives at said port;

verifying a working control path to said redundant switching element, comprising the steps of:

sending a connection request from said port to said redundant switching element;

starting a third timer;

logging a control path good condition if said connection request is returned from said redundant switching element to said port; and logging a data path bad condition if said third timer expires before said connection request is received at said port.

13. The method of claim 12 wherein said fully redundant switching network has an active data path for switching data, wherein said active data path comprises at least said inbound data path and said outbound data path, further comprising the steps of:

changing said active data path from said active switching element to said redundant switching element before said step of sending said test pattern; and changing the active data path from said redundant switching element to said active switching element after said step of logging said data path bad condition.

14. The method of claim 12, wherein said step of starting said first timer further comprises setting said first timer to expire in 100 microseconds.

15. The method of claim 12, further comprising the steps of:

detecting an occurrence of a frame on said inbound path;

waiting a period of time after said step of detecting before said step of sending a test pattern.

16. The method of claim 15, wherein said period of time is 20 microseconds.

17. The method of claim 12, wherein said step of starting said second timer further comprises setting said second timer to expire in 10 microseconds.

18. The method of claim 12, wherein said step of starting said third timer further comprises setting said third timer to expire in 3 microseconds.

19. A method of performing an online, non-disruptive data path health check test in a fully redundant fibre channel switching network having an active switching element and a redundant switching element and a data path from a port to said redundant switching element, said data path comprising at least an inbound path and an outbound path, said data path health check test performed on said redundant switching element, said method comprising:

starting a first timer;

monitoring said inbound path for an occurrence of a frame, said inbound path facilitates the movement of frames in a direction oriented from said port to both said redundant switching element and said active switching element;

monitoring said outbound path for an occurrence of a frame, said outbound path facilitates the movement of frames in a direction oriented from both said redundant switching element and said active switching element to said port;

terminating said health check test if said timer expires before both a frame occurs on said outbound path and a frame occurs on said inbound path;

sending a test pattern from said port to said redundant switching element on said inbound path;

starting a second timer;

monitoring said port for the occurrence of said test pattern on said outbound path;

logging a data path good condition if said test pattern arrives at said port; and logging a data path bad condition if said second timer expires before said test pattern arrives at said port.

20. The method of claim 19 wherein said fully redundant switching network has an active data path for switching data, wherein said active data path comprises at least said inbound data path and said outbound data path, further comprising the steps of:

changing said active data path from said active switching element to said redundant switching element before said step of sending said test pattern; and changing said active data path from said redundant switching element to said active switching element after said step of logging said data path bad condition.

21. The method of claim 19, wherein said step of starting said first timer further comprises setting said first timer to expire in 100 microseconds.

22. The method of claim 19, further comprising the steps of:

detecting an occurrence of a frame on said inbound path;

waiting a period of time after said step of detecting before said step of sending a test pattern.

23. The method of claim 22, wherein said period of time is 20 microseconds.

24. The method of claim 19, wherein said step of starting said second timer further comprises setting said second timer to expire in 10 microseconds.

25. A method of performing an online, non-disruptive control path health check test in a fully redundant fibre channel switching network having an active switching element and a redundant switching element, said health check test performed on said redundant switching element, said method comprising:

sending a connection request from said port to said redundant switching element;

starting a timer;

logging a control path good condition if said connection request is returned from said redundant switching element to said port; and logging a data path bad condition if said timer expires before said connection request is received at said port.

26. The method of claim 25, wherein said step of starting said timer further comprises setting said timer to expire in 3 microseconds.

27. A method of performing automatic switchover in a fully redundant fibre channel switching network having an active switching element, a redundant switching element and a port having switching element logic embodied therein, said method comprising:

detecting a failure condition in said active switching element;

transmitting said failure condition to said switching element logic;

querying said port to determine if said port is transmitting a frame;

delaying said automatic switchover if said port is transmitting a frame; and performing the switchover to said redundant switching element if said port is not transmitting a frame.

* * * * *